United States Patent
Goodsitt et al.

(10) Patent No.: US 11,651,098 B2
(45) Date of Patent: May 16, 2023

(54) METHODS AND SYSTEMS FOR GENERATING RECOMMENDATIONS BASED ON NON-DELINEATED ENCRYPTED RECORDS COLLECTED BY A DATA AGGREGATION SERVICE DURING COMMUNICATIONS BETWEEN USERS AND CONTENT SOURCES

(71) Applicant: Capital One Services, LLC, McLean, VA (US)

(72) Inventors: Jeremy Goodsitt, McLean, VA (US); Vincent Pham, McLean, VA (US); Alvin Hua, McLean, VA (US); Austin Walters, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 183 days.

(21) Appl. No.: 16/900,805

(22) Filed: Jun. 12, 2020

(65) Prior Publication Data
US 2021/0390200 A1    Dec. 16, 2021

(51) Int. Cl.
*G06F 21/62*    (2013.01)
*G06Q 20/12*    (2012.01)
*G06Q 20/40*    (2012.01)

(52) U.S. Cl.
CPC ..... *G06F 21/6227* (2013.01); *G06Q 20/1235* (2013.01); *G06Q 20/407* (2013.01)

(58) Field of Classification Search
None
See application file for complete search history.

(56) References Cited

U.S. PATENT DOCUMENTS

| | | | |
|---|---|---|---|
| 8,781,882 B1* | 7/2014 | Arboletti | G06Q 10/0639 |
| | | | 705/7.41 |
| 2009/0240568 A1* | 9/2009 | Ramer | G06F 16/68 |
| | | | 705/35 |
| 2009/0254572 A1* | 10/2009 | Redlich | G06Q 10/06 |
| 2011/0295722 A1* | 12/2011 | Reisman | G06Q 30/0641 |
| | | | 705/26.1 |

FOREIGN PATENT DOCUMENTS

| | | | | |
|---|---|---|---|---|
| CA | 2764493 A1 * | 12/2010 | | G06Q 30/02 |
| WO | WO-2020219666 A1 * | 10/2020 | | |

OTHER PUBLICATIONS

Modaresi, S., "Data-Driven Learning Model with Applications to Retail Operations", Duke University, ProQuest LLC (2018) (Year: 2018).*

* cited by examiner

*Primary Examiner* — Neha Patel
*Assistant Examiner* — Clay C Lee
(74) *Attorney, Agent, or Firm* — Perkins Coie LLP

(57) ABSTRACT

Methods and systems are described for generating recommendations based on non-delineated records collected by a data aggregation service during communications between users and content sources. For example, based on collecting records on exchanges between users and content sources that is traditionally neither stored nor identified by either party, a data aggregation service may generate recommendations related to future exchanges of content between the same or different users and/or the same or different content sources.

20 Claims, 5 Drawing Sheets

METHODS AND SYSTEMS FOR GENERATING RECOMMENDATIONS BASED ON NON-DELINEATED ENCRYPTED RECORDS COLLECTED BY A DATA AGGREGATION SERVICE DURING COMMUNICATIONS BETWEEN USERS AND CONTENT SOURCES

FIELD OF THE INVENTION

The invention relates to generating recommendations based on non-delineated encrypted records collected by a data aggregation service during communications between users and content sources.

BACKGROUND

In recent years, users are increasingly consuming content and performing activities on-line and/or in electronic-based mediums. This consumption and these on-line activities are frequently facilitated through on-line exchanges and may happen quicker and with more frequency than exchanges on traditional mediums. One drawback of such an approach is when this content relates to a given product, which a user may be able to view, but not otherwise interact with. The user may in fact not actually interact with this product until it is received.

SUMMARY

In view of this problem, users are increasingly receiving content (e.g., a product) for which the user has not yet physically interacted with. This is particularly problematic with content in which a physical interaction with the content is of a primary concern. This lack of physical interaction prior to receiving the content may lead to negative user experiences and increased instances of users returning the content to the source. These returns, particularly in on-line and/or electronic-based mediums, result in delivery service assessments, mail service assessments, service assessments to a supplier of the source, and/or credit card transaction and exchange service assessments. Some or all of these may be absorbed into and/or accounted for in a content return value provided by the source. However, without a standardized mechanism for determining how sources, or any source in particular, account for these, what these service assessments may be in a given scenario, and/or how to determine any of these factors in advance, users are left exposed to unexpected and undefinable risks of content return values.

In view of this, methods and systems are described for generating recommendations based on non-delineated encrypted records collected by a data aggregation service during communications between users and content sources. For example, based on collecting delineating records based on communications between users and content sources that are traditionally neither stored nor identified by either party, a data aggregation service may generate recommendations related to future exchanges of content between the same or different users and/or the same or different content sources. For example, with the rise of electronic and/or credit based transactions, data aggregation services (e.g., credit card providers, banks, budgeting applications, etc.) that monitor and/or facilitate exchanges between users and sources may obtain information on the exchanges. Conventional systems however do not track particular service assessments, distinguish between types of service assessments, or have mechanisms to do so. That is, the data is non-delineated. For example, conventional electronic payment and banking systems encrypt and record only transaction amounts. These transaction amounts are, in most scenarios, not specific to a content item. For example, in conventional systems a transaction record may include the communication of multiple products. A transaction record returning an item (and/or whether a content return value was applied) is likewise not specific to the item. Instead only factors such as the purchaser, source, and amount are recorded.

The disclosed system provides an improvement over these conventional systems by storing specific information as part of an exchange beyond the information that is normally stored. For example, the systems and methods herein improve upon those systems by delineating and recording additional information such as a content identifier, which may be used to correlate particular content to an amount in a communication and/or distinguish between communication amounts featuring multiple content items. For example, for each record, the system may determine a content identifier and a communication amount for the first content in the recorded communication. While this information may be stored electronically (e.g., by the source) or physically (e.g., on a paper communication), this information is not delineated in conventional systems.

The methods and systems herein improve by querying sources for this information in order to delineate communication amounts per the content item. For example, in response to receiving an encrypted record, the system may generate a new file record. The new file record may include additional columns of data that may be populated with information from one or more sources. For example, the system may parse sales agreements and website information to detect published content return values. These published service assessments may be compared with, and used to verify and determine content return values. The system may also query user accounts and transaction records in order to identify content return values. In some embodiments, the system may query the user to capture images (e.g., using a smartphone) that correlate content items (and individual prices thereof) in a transaction. As new information is received, the system updates the new file record with this information. As the information is complied, the system is able to delineate the original encrypted record.

Moreover, the system uses this information to generate a new metric that represents the content return value. Upon the determination of this metric, the metric may be used to generate additional projections, based on varying criteria, in order to provide recommendations to the users. These recommendations may correspond to protection plans to the user for potential content return values. The system may further generate triggers for these plans based on the user and/or factors related to a plurality of users such as a time period, aggregated amounts or numbers of communications, etc.

In one aspect, the disclosure describes a system for generating recommendations based on encrypted records collected by a data aggregation service during communications between users and content sources. For example, the system may store a first encrypted record, wherein the first encrypted record includes a first content identifier and a first communication amount for first content corresponding to the first content identifier, and wherein the first encrypted record is generated in response to a receipt of the first content from a first source. The system may then store a second encrypted record, wherein the second encrypted record includes the first content identifier and a first communication amount (e.g., a first return amount) for the first content corresponding to the first content identifier, wherein the second encrypted record is generated in response to a receipt of the first content from the first source (e.g., in response to returning the first content to the first source). The system may then determine a first difference between the first communication amount and the first communication amount (e.g., first return amount), and the system may determine a first metric for the first source based on the first difference. The system may then generate for display a first recommendation based on the first metric, wherein the first recommendation is for a content return value protection service for the first source.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
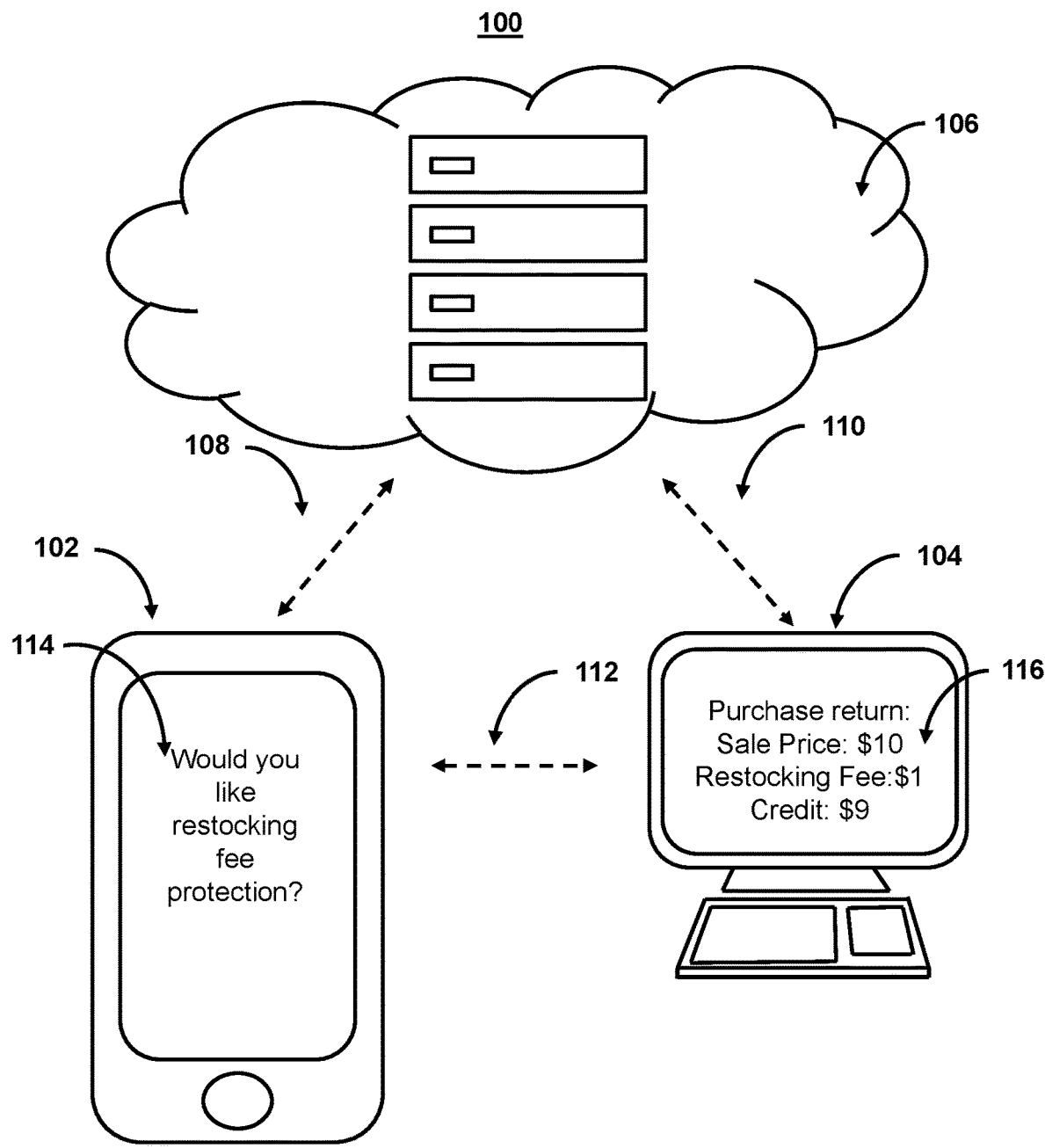
FIG. 1 shows an illustrative system for generating recommendations based on encrypted records collected by a data aggregation service during communications between users and content sources, in accordance with one or more embodiments.

FIG. 1 shows an illustrative system for generating recommendations based on encrypted records collected by a data aggregation service during communications between users and content sources, in accordance with one or more embodiments. As shown in FIG. 1, system 100 may include mobile device 102 and user terminal 104. While shown as a smartphone and personal computer, respectively, in FIG. 1, it should be noted that mobile device 102 and user terminal 104 may be any computing device, including, but not limited to, a laptop computer, a tablet computer, a hand-held computer, other computer equipment (e.g., a server), including "smart," wireless, wearable, and/or mobile devices. FIG. 1 also includes server 106. Server 106 may alternatively be any computing device as described above and may include any type of mobile terminal, fixed terminal, or other device. For example, server 106 may be implemented as a cloud computing system and may feature one or more component devices. It should also be noted that system 100 is not limited to three devices.

For example, system 100 may include cloud-based memory configured to store one or more encrypted records. The one or more encrypted records may store information about one or more transactions. As referred to herein, a transaction may refer to an exchange or interaction between people and/or entities. For example, an illustrative interaction may include a user purchasing content from another person or entity. It should be noted that the embodiments of this disclosure may be applied to any potential source of content (e.g., whether a person and/or entity). Furthermore, as referred to herein, the transaction may relate to any content. The content may be a good or service or a mixture thereof.

A data aggregation service (e.g., a data aggregation service to the transaction, which may also be a person or entity) may monitor the communications. In some embodiments, the data aggregation service is a credit card or other electronic payment facilitator that facilitates the transaction (e.g., by providing the mechanism or means for exchanging payment in order to enable the transaction). The data aggregation service may generate an encrypted record for the transaction, and the encrypted record may record all information needed to generate recommendations related to content return values as discussed herein. For example, the encrypted record may include a content identifier. The content identifier may represent any data that distinguishes the content from other content and/or the transaction related to the content from a transaction related to other content. For example, the content identifier may include a serial number and/or other alpha-numeric character string that represents the content.

The encrypted record may also include other information about transactions such as a purchase or reimbursement amount, service assessments associated with the transactions, a user account associated with a transaction, a merchant associated with the transaction, an address of the merchant associated with the transaction, and/or information related to the data aggregation service. In some embodiments, the encrypted record may be generated by a data aggregation service that is facilitating the transaction. For example, the transaction may appear as a transaction of a user's account and/or may be associated with other information in a user's profile.

Notably, the system may delineate the amounts in communications based on several techniques. For example, conventional electronic payment and banking systems record only transaction amounts. These transaction amounts are, in most scenarios, not specific to a content item. For example, in conventional systems a transaction record may include the communication of multiple products. A transaction record returning an item (and/or whether a content return value was applied) is likewise not specific to the item. Instead only factors such as the communication, source, and amount are recorded.

The systems and methods herein improve upon that system by delineating additional information from a communication and recording that additional information such as a content identifier, which may be used to correlate particular content to a communication amount and/or distinguish between communication amounts featuring multiple content items. For example, each encrypted record corresponding to a communication includes a content identifier and a communication amount for first content. While this information may be stored electronically (e.g., by the source) or physically (e.g., on a paper communication), this information is not transmitted to third parties in conventional systems.

The methods and systems herein improve by querying sources for information needed to delineate information in order to determine communication amounts per the content item. Additionally, the system may parse sales agreements and website information to detect published content return values (e.g., restocking service assessments). These published service assessments may be compared with, and used to verify, determined content return values. The system may also query user accounts and transaction encrypted records in order to identify content return values. In some embodiments, the system may query the user to capture images (e.g., using a smartphone) that correlates content items (and individual prices thereof) in a transaction.

In some embodiments, the system may also pull data from public and governmental records. For example, the public and governmental encrypted records may indicate current sales tax and/or exchange service assessments, both at the time of communication and time or communication. The difference in these taxes and/or service assessments may be used by the system to delineate content return values (e.g., based on a difference in communication and communication amount provided by a source) and verify any discrepancies.

In some embodiments, each determined content return value may include a confidence level that the determined content return value reflects an actual content return value (e.g., an actual restocking service assessment). Transactions having a predetermined confidence level (e.g., exceeding a predetermined threshold) may be used by the system to generate metrics and/or recommendations. In some embodiments, the system may assign a confidence level based on a percentage of a communication amount, a number of communications, and/or a frequency of the communications.

In some embodiments, the record may include a user identifier, which may be a number and/or other information used to identify a user. The user identifier may further be linked to a user account, device, etc. The system may use this information to determine whether or not a given transaction corresponds to a single user. For example, a first encrypted record and a second encrypted record may include a first user identifier corresponding to a first user, wherein a third encrypted record and a fourth encrypted record further include second user identifier corresponding to a second user. In some embodiments, the encrypted record may include a time period, geographic region, type of content and/or other information corresponding to a communication. For example, the system may generate a metric based on this information.

For example, in some embodiments, the system may retrieve a user profile for a user. The user profile may include data that is actively or passively compiled on a user. For example, the data may include demographic, geographic, and/or financial data on the user. The data may indicate the preferences, tastes, habits, and/or recent activities of the user (e.g., recent communications). The user profile may comprise a digital representation of the user. This representation may be organized into transactions, scenarios, and/or behaviors of the user. The transactions, scenarios, and/or behaviors may include any information about an event, course of action, or other circumstance related to the user. For example, the scenario may include where a user last shopped, where the user normally shops, what items were communicated, etc. The profile may also include a behavior for the user in the given scenario (e.g., the manner, way, characteristics, and/or any other information about the user's conduct in the scenario). The profile may also include one or more categories in which the user falls. These categories may be used by the system to select other users to compare to the user. The categories may include any information that distinguishes one user from another or from a group of users. The system may also use this information to determine a content return value (e.g., that may be used for generating a content return value protection plan) and/or criteria related to the content return value (e.g., as described in FIG. 4).

The user profile may include data of various types and from various sources. It should be noted, as described herein, a source may include a given merchant, a group of merchants, and/or other provider content. For example, the user profile may include data on credit/debit card communications, purchasing trends (e.g., where the user spends, what the user buys, how much the user spends), phone call interactions (e.g., how often a user calls, the number called, and the number called from), digital engagement history of the user (e.g., does the user use a mobile app, what devices does the user use, when and how often does the user log in), text/chat history, map and global positioning data (e.g., where the user is located, where the user has been located in the past, areas frequented by a user, distances traveled by a user).

The system may aggregate encrypted records related to one or more transactions (e.g., in server 106). For example, a first encrypted record may include a first content identifier and a first communication amount for first content corresponding to the first content identifier, wherein the first encrypted record is generated in response to a receipt of the first content from a first source. A second encrypted record may include the first content identifier and a first communication amount for the first content corresponding to the first content identifier, wherein the second encrypted record is generated in response to a receipt of the first content from the first source. A third encrypted record may include a second content identifier and a second communication amount for second content corresponding to the second content identifier, wherein the third encrypted record is generated in response to a second communication of the first content from a second source. A fourth encrypted record may include the second content identifier and a second communication amount for the second content corresponding to the second content identifier, wherein the fourth encrypted record is generated in response to a second communication of the second content from the second source.

The system may also include cloud-based control circuitry configured to determine one or more metrics for determining a content return value (e.g., that may be used for generating a content return value protection plan). The metric may be a quantitative or qualitative assessment of a current or previous content return value. For example, the metric may be an amount paid in total, or as part of, a content return value. For example, the metric service assessment may be a percentage, ratio, average, or other measurement of amount and/or frequency of a content return value. For example, the system may determine a first difference between the first communication amount and the first communication amount. The system may then determine a first metric for the first source based on the first difference. In such cases, the first metric may correspond to an amount of the difference, a percentage of the difference, and/or other measurement based on the first difference.

In some embodiments, the system may also be based on a metric of multiple transactions that are related to a single user, a single transaction, a single source, a single time period, etc. For example, after determining the first metric, the system may then determine a second difference between a second communication amount and a second communication amount. The system may then determine a second metric for the second source based on the second difference. The system may then determine a composite metric based on the first metric and the second metric. For example, the system may determine a metric that shows the average amount of a content return value paid by a given user, required by one or more sources, during a given time period, etc. In some embodiments, the second metric may be based on a transaction involving a different user, source, time period, type of content, etc.

The system may also include cloud-based input/output (hereinafter "I/O") circuitry configured to generate one or more user interfaces. The user interface may allow a user or a source to input information to system 100 and/or a user to access an output of system 100. For example, system 100 may generate for display, on a user device, a recommendation (e.g., recommendation 114 or recommendation 116) based on a metric and/or composite metric (e.g., based on a recommendation for a content return value protection service). For example, users may, for instance, utilize one or more devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of mobile device 102, those operations may, in some embodiments, be performed by components of server 106. In some embodiments, the various computers and systems described herein may include one or more computing devices that are programmed to perform the described functions. Additionally or alternatively, multiple users may interact with system 100 and/or one or more components of system 100. For example, in one embodiment, a first user and a second user may interact with system 100 using two different components.

With respect to the components of mobile device 102, user terminal 104, and server 106, each of these devices may receive content and data via I/O paths. Each of these devices may also include processors and/or control circuitry to send and receive commands, requests, and other suitable data using the I/O paths. The control circuitry may comprise any suitable processing circuitry. Each of these devices may also include a user input interface and/or user output interface (e.g., a display) for use in receiving and displaying data. For example, as shown in FIG. 1, both mobile device 102 and user terminal 104 include a display upon which to display data. Additionally, as mobile device 102 and user terminal 104 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to generating recommendations based on encrypted records collected by a data aggregation service during communications between users and content sources.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications network or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Server 106 may be a database configured to store user data for a user. For example, the database may include user data that the system has collected about the user through prior transactions. Additionally or alternatively, the system may act as a clearing house for multiple sources of information about the user. Server 106 may also include control circuitry configured to perform the various operations needed to verify an identity of a user through contextual knowledge-based authentication. For example, server 106 may receive, from mobile device 102 or user terminal 104, an authentication request for a user.

In some embodiments, the system may generate for display a recommendation. The recommendation may comprise any audio, textual, graphical, and/or other cues to a user. In some embodiments, the recommendation may be computer-readable information, which triggers subsequent actions by other components (e.g., one or more components of system 100). For example, in some embodiments, a recommendation may comprise a query to a user to accept a content return value protection plan. For example, the system may determine that the user is about to make a communication in which the source has a content return value (e.g., based on information in the system about the source). The system may, in response, trigger a recommendation. For example, the system may receive a user input corresponding to a point of sale of the first source, and the system may determine to generate the first recommendation in response to receiving the user input.

Figure 2:
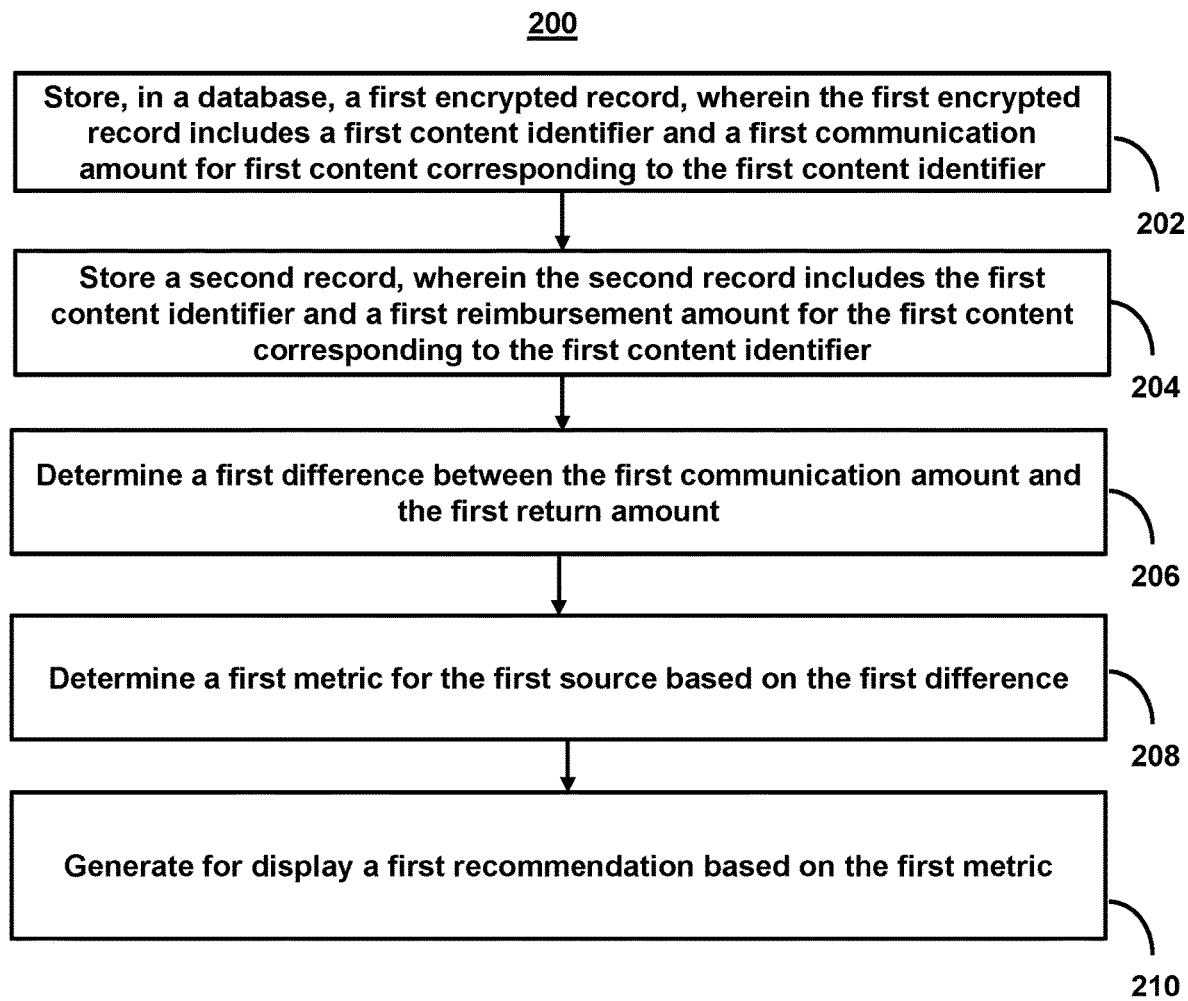
FIG. 2 shows a flowchart of the steps involved in generating recommendations based on encrypted records collected by a data aggregation service during communications between users and content sources, in accordance with one or more embodiments.

FIG. 2 shows a flowchart of the steps involved in generating recommendations based on encrypted records collected by a data aggregation service during communications between users and content sources, in accordance with one or more embodiments. For example, process 200 may represent the steps taken by one or more devices as shown in FIG. 1 to generate recommendations based on metrics.

At step 202, process 200 stores (e.g., by control circuitry of one or more of the devices in FIG. 1), in a database, a first encrypted record, wherein the first encrypted record includes a first content identifier and a first communication amount (e.g., a first return amount) for first content corresponding to the first content identifier, and wherein the first encrypted record is generated in response to a receipt of the first content from a first source. For example, the first encrypted record may have been collected by a data aggregation service source that facilitated a transaction between a user and the first source. In addition to creating a encrypted record of the transaction, the system may also parse the information to determine the first communication amount. In some embodiments, the system may determine this by comparing exchange service assessment rates and/or query the first source for additional information.

At step 204, process 200 stores (e.g., by control circuitry of one or more of the devices in FIG. 1), in the database, a second encrypted record, wherein the second encrypted record includes the first content identifier and a first return amount for the first content corresponding to the first content identifier, wherein the second encrypted record is generated in response to returning the first content to the first source. For example, the second encrypted record may have been collected by the data aggregation service source that facilitated the transaction between the user and the first source. In addition to creating the first encrypted record of the transaction, the system may have monitored for similar transactions in order to generate the second encrypted record. For example, the system may monitor all transactions of the user and compare Merchant ID data (e.g., data created during a transaction that identifies the source). In response to detecting the same Merchant ID data for a communication as was previously identified for a communication, the system may store a second encrypted record. The system may also parse the information to determine a first communication amount. In some embodiments, the system may determine this by comparing exchange service assessment rates and/or query the first source for additional information. This may include determining a particular content item corresponding to the communication and/or a communication price of the content item.

At step 206, process 200 determines (e.g., by control circuitry of one or more of the devices in FIG. 1) a first difference between the first communication amount and the first return amount after delineating the first communication amount and the first return amount from the first encrypted record and the second encrypted record based on received metadata related to the first encrypted record and the second encrypted record. For example, the system may determine the first difference after delineating the first communication amount and the first return amount from the first encrypted record and the second encrypted record based on received metadata related to the first encrypted record and the second encrypted record. For example, the system may determine the content return value based on subtracting the first communication from the first communication amount. In some embodiments, the system may determine additional information based on the difference (e.g., a percentage of the total amount that constitutes the difference, etc.). The system may then use the result of this processing to generate the first metric. To delineate this data, the system may pull additional metadata from respective sources. The respective sources may indicate additional amounts, content items, or service assessments attributed to the encrypted record.

For example, in response to receiving an encrypted record, the system may generate a new file record comprising metadata related to the encrypted record. The new file record may include additional columns of data that may be populated with information from one or more sources. For example, the system may parse sales agreements and website information to detect published content return values. Published service assessments may, likewise, be added to the new file record. The system may also query user accounts and transaction records in order to identify content return values. In some embodiments, the system may query the user to capture images (e.g., using a smartphone) that correlates content items (and individual prices thereof) in a transaction. As new information is received, the system updates the file record with this information. As the information is complied, the system is able to delineate the original encrypted record.

In some embodiments, the system may use multiple naming conventions, format, and value types of a category, value, etc. and these may differ from that of the user profile data (as stored on a user device or an aggregation service), server 106 (or other component of system 100) may use matching algorithms that may support exact match techniques and/or partial or "fuzzy" matching logic (e.g., searching for a closest match) to locate alternate spellings, naming conventions, etc. for categories and/or value. For example, a column name associated with user data stored by an aggregation service may be compared to a category and/or value for a source. In another example, metadata associated with user data stored by an aggregation service (e.g., describing a clearance in the account of the user) may be compared to metadata of a corresponding record, entry, category, and/or value for the source. Based on the degree of similarity between the headings, metadata, and/or other data a "similarity metric" may be assigned using any suitable algorithm or weighting logic. In response to the similarity metric being determined, the system may compare the similarity metric to a predetermined threshold to determine whether or not a value corresponds. Accordingly, the system may determine the first communication amount and the first return amount by delineating the encrypted communications.

At step 208, process 200 determines (e.g., by control circuitry of one or more of the devices in FIG. 1) a first metric for the first source based on the first difference. For example, the system may determine a quantitative or qualitative assessment of a content return value charged by the first source. The system may then assign this first metric to the first source, the user, and/or a type of content and/or transaction.

At step 210, process 200 generates (e.g., by control circuitry of one or more of the devices in FIG. 1) for display, on a user device, a first recommendation based on the first metric, wherein the first recommendation is for a content return value protection service for the first source. For example, the system may generate for display a recommendation (e.g., recommendation 114 (FIG. 1) and recommendation 116 (FIG. 1)). In some embodiments, this recommendation may provide an option to obtain a content return value protection plan.

It is contemplated that the steps or descriptions of FIG. 2 may be used with any other embodiment of this disclosure. In addition, the steps and descriptions described in relation to FIG. 2 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 2.

Figure 3:
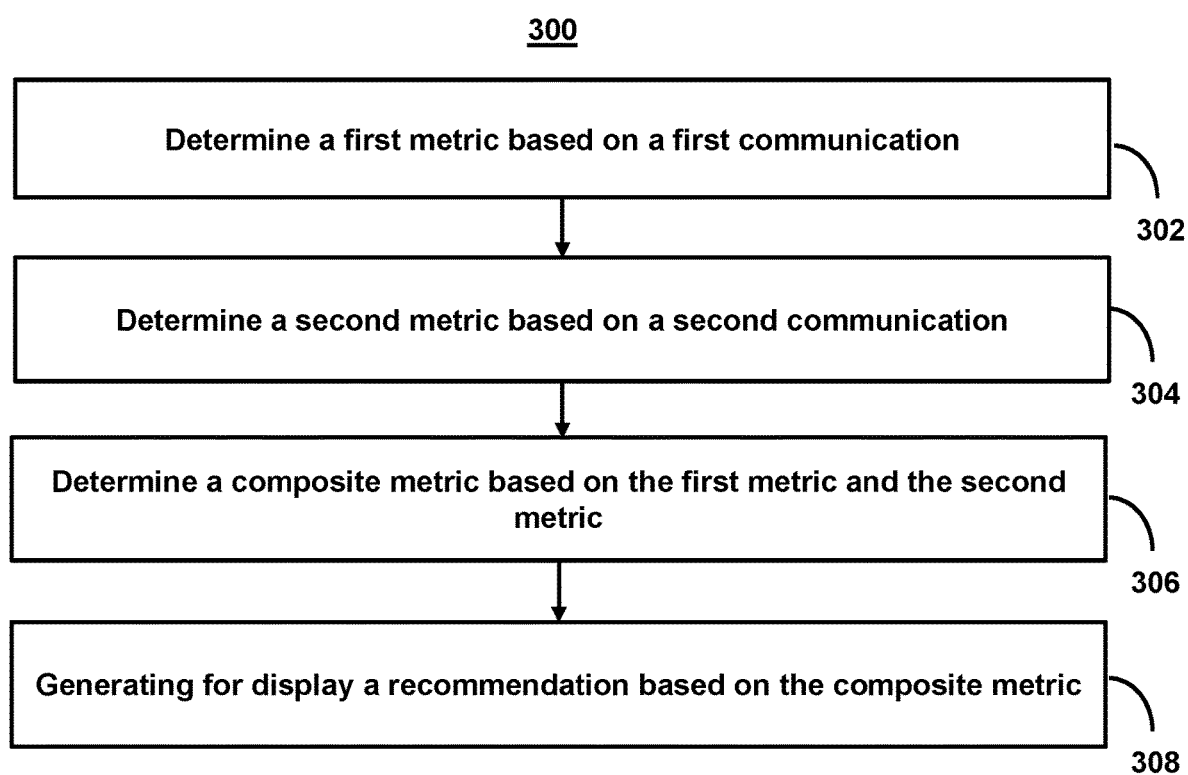
FIG. 3 shows a flowchart of the steps involved in generating recommendations based on composite metrics, in accordance with one or more embodiments.

FIG. 3 shows a flowchart of the steps involved in generating recommendations based on composite metrics, in accordance with one or more embodiments. For example, process 300 may represent the steps taken by one or more devices as shown in FIG. 1 when determining a metric associated with a plurality of users, sources, transactions, etc.

At step 302, process 300 determines (e.g., by control circuitry of one or more of the devices in FIG. 1) a first metric based on a first communication. For example, the system may determine a first metric based on process 200 (FIG. 2). The first metric may be based on the same user, content source, type of content, time period, and/or other criteria.

At step 304, process 300 determines (e.g., by control circuitry of one or more of the devices in FIG. 1) a second metric based on a second communication. For example, the system may store a third encrypted record. The third encrypted record may include a second content identifier and a second communication amount for second content corresponding to the second content identifier. Additionally or alternatively, the third encrypted record may be generated in response to a second communication of the first content from the first source. The system may also store a fourth encrypted record. The fourth encrypted record may include the second content identifier and a second communication amount for the second content corresponding to the second content identifier. The fourth encrypted record may be generated in response to returning the second content to the first source. The system may then determine a second difference between the second communication amount and the second communication amount, and the system may then determine a second metric for the first source based on the second difference.

At step 306, process 300 determines (e.g., by control circuitry of one or more of the devices in FIG. 1) a composite metric based on the first metric and the second metric. For example, the system may compare the first metric and the second metric to determine an average, mean, and/or median metric. The system may then determine a composite metric and then assign this composite metric to the user, content source, type of content, time period, and/or other group.

At step 308, process 300 generates (e.g., by control circuitry of one or more of the devices in FIG. 1) for display a recommendation based on the composite metric. For example, the system may generate for display a recommendation (e.g., recommendation 114 (FIG. 1) and recommendation 116 (FIG. 1)). In some embodiments, this recommendation may provide an option to obtain a content return value protection plan.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one of more of the steps in FIG. 3.

Figure 4:
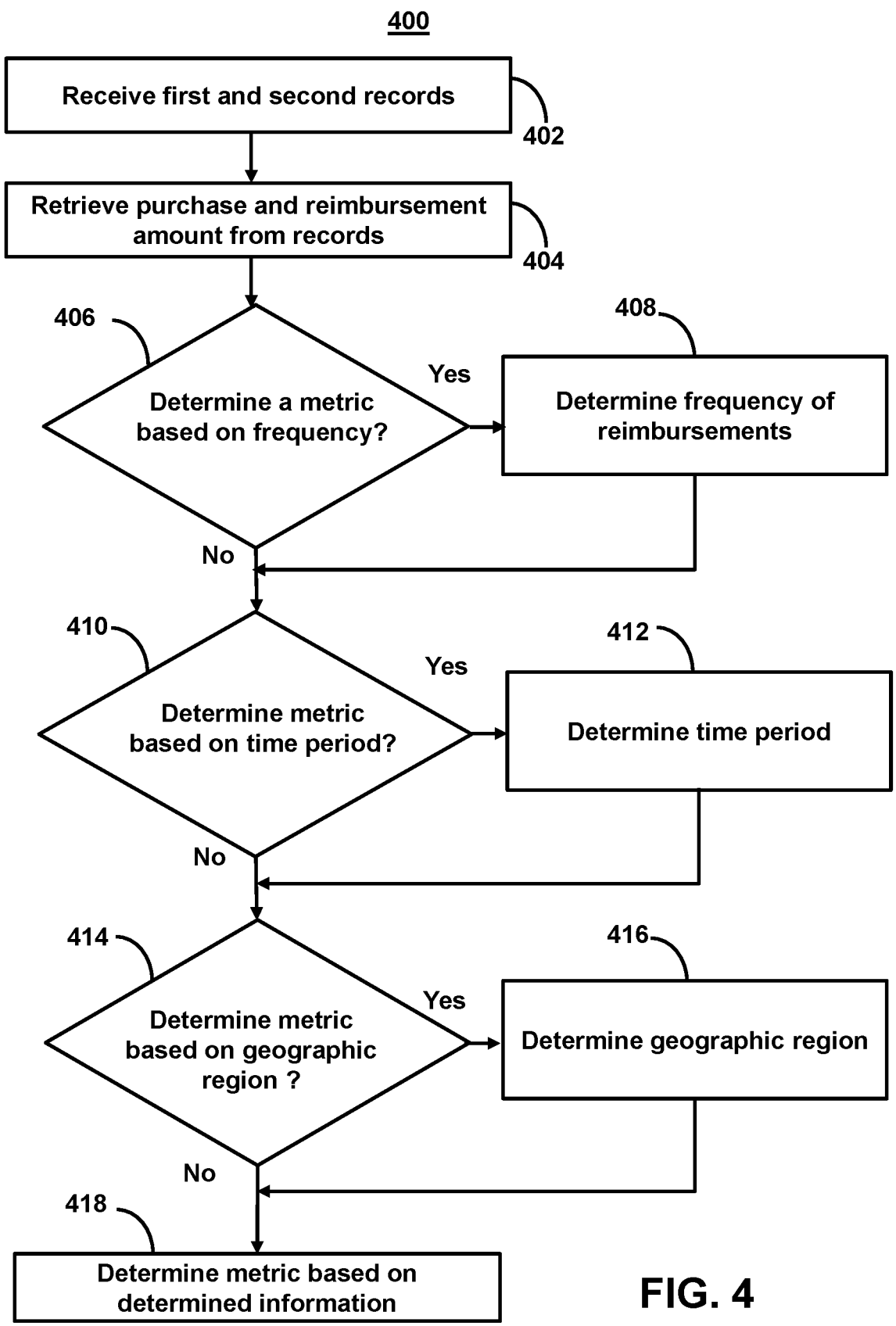
FIG. 4 shows a flowchart of the steps involved in generating a metric based on data collected by a data aggregation service, in accordance with one or more embodiments.

FIG. 4 shows a flowchart of the steps involved in generating a metric based on data aggregation service collected data, in accordance with one or more embodiments. For example, process 400 may represent the steps taken by one or more devices as shown in FIG. 1 when generating a metric for use in a recommendation. As described in FIG. 4, the system may use multiple factors and/or criteria when generating a metric.

At step 402, process 400 receives (e.g., by control circuitry of one or more of the devices in FIG. 1) first and second encrypted records. For example, the system may receive one or more encrypted records corresponding to a communication and communication of common content. The system may determine that the encrypted records relate to a single transaction based on a content identifier, user identifier, Merchant ID, time stamp, and/or other information found in the encrypted records. For example, the system may iteratively compare data found in encrypted records to identify matches. In response to identifying a match, the system may process the encrypted records to generate a metric.

At step 404, process 400 receives (e.g., by control circuitry of one or more of the devices in FIG. 1) a communication amount and a return amount from the first and second encrypted records. For example, the system may parse the encrypted record to identify fields associated with a purchase amount and a reimbursement amount for content. In some embodiments, these fields may be generated by the system based on querying a user and/or a source, parsing data of encrypted records of the transaction, and/or comparing price codes on sales and return communications. For example, the system may receive additional information (e.g., metadata) used to delineate encrypted records.

At step 406, process 400 determines (e.g., by control circuitry of one or more of the devices in FIG. 1) whether a metric is based on a frequency of communications. For example, in some embodiments, the system may determine how often a user, a source, a type of content, and/or a group of similar users (e.g., based on a comparison of user profiles) is subjected to a content return value. Based on this determination, the system may adjust a metric (e.g., a metric as determined in FIGS. 2-3 above). If process 400 determines the metric is based on a frequency of communications, process 400 continues to step 408. If process 400 determines the metric is not based on a frequency of communications, process 400 continues to step 410.

At step 408, process 400 determines (e.g., by control circuitry of one or more of the devices in FIG. 1) a frequency of returns. For example, the system shows how often a user, a source, a type of content, and/or a group of similar users (e.g., based on a comparison of user profiles) is subjected to a content return value. To do so, the system may parse encrypted records for the frequency of the relevant criteria (e.g., a user, a source, a type of content, and/or a group of similar users). Upon finding multiple instances of the relevant criteria, the system may determine the frequency. To assess the frequency, the system may retrieve a test period (e.g., a month, year, etc.). For example, if there is a high frequency of communications, the system may adjust the metric to reflect this. The metric may then be used to trigger a recommendation or adjust a recommendation (e.g., offer a higher content return value protection level, offer a longer term, offer a discount service assessment for the protection plan, etc.). In another example, the system may store the first encrypted record and the second encrypted record in a user profile corresponding to a user. The system may determine a frequency of communications for the user. The first metric may then be further based on the frequency of communications for the user.

At step 410, process 400 determines (e.g., by control circuitry of one or more of the devices in FIG. 1) whether the metric is based on a time period. For example, the system may determine how many instances of a content return value was applied during a given month. For example, a first encrypted record and a second encrypted record may include a time period corresponding to the first communication. The system may base the first metric on the time period determined. If process 400 determines that the metric is based on the time period, process 400 proceeds to step 412. If process 400 determines that the metric is not based on the time period, process 400 proceeds to step 414.

At step 412, process 400 determines (e.g., by control circuitry of one or more of the devices in FIG. 1) the time period. For example, the system may store a time stamp associated with each of the encrypted records. The system may then filter encrypted records based on a given time period. For example, the system may determine how many content return values are detected during a given month or holiday season. The system may then use this amount to adjust the metric. For example, if there is a high number of communications in a given time period, the system may adjust the metric to reflect this. The metric may then be used to trigger a recommendation or adjust the recommendation (e.g., offer a higher content return value protection level, offer a longer term, offer a discount service assessment for the protection plan, etc.).

At step 414, process 400 determines (e.g., by control circuitry of one or more of the devices in FIG. 1) whether the metric is based on a geographic region. For example, the system may determine how many instances of a content return value was applied in a given area. If process 400 determines that the metric is based on a geographic region, process 400 proceeds to step 416. If process 400 determines that the metric is not based on a geographic region, process 400 proceeds to step 418.

At step 416, process 400 determines (e.g., by control circuitry of one or more of the devices in FIG. 1) the geographic region. For example, the system may store a location field for each of the encrypted records. The system may then determine which of the encrypted records has a location field that corresponds to a given geographic area. For example, the system may determine how many content return values are detected in an area. The system may then use this amount to adjust the metric. For example, if there is a high number of communications in a given geographic region, the system may adjust the metric to reflect this. The metric may then be used to trigger a recommendation or adjust the recommendation (e.g., offer a higher content return value protection level, offer a longer term, offer a discount service assessment for the protection plan, etc.).

At step 418, process 400 determines (e.g., by control circuitry of one or more of the devices in FIG. 1) the metric based on retrieved information. For example, the system may determine the metric based on the one or more pieces of determined information. Accordingly, the system may dynamically adjust the metric and/or recommendation based on the metric based on both the actions of a user and other users.

In some embodiments, the system may determine other information and use that information to determine a metric. For example, the system may determine a percentage of the first communication amount corresponding to the first difference. The system may then adjust the first metric to reflect this. In another example, the system may predict a number of communications during a time period. The system may then base the metric on the number of communications. In another example, the system may determine a content type corresponding to the content and base the metric on that content (e.g., some content may be more prone to corresponding to a content return value than other content).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 4.

Figure 5:
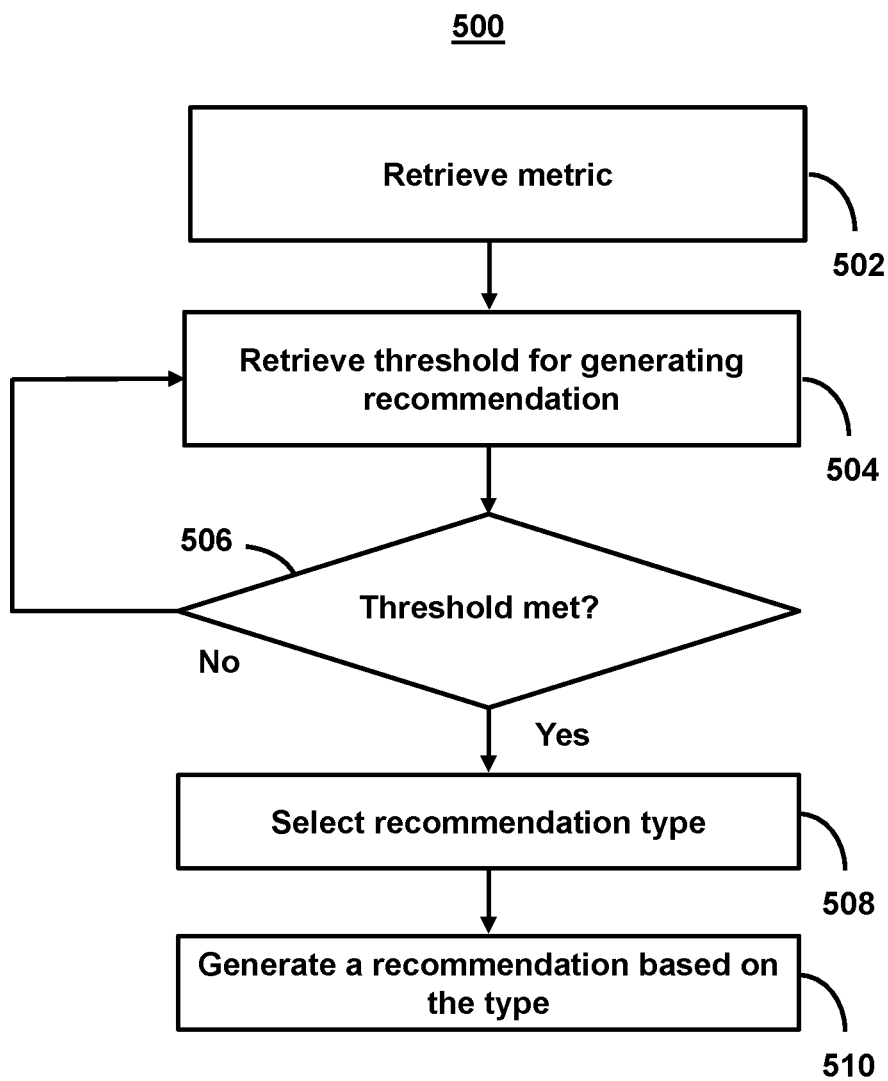
FIG. 5 shows a flowchart of the steps involved in generating a recommendation based on a metric, in accordance with one or more embodiments.

FIG. 5 shows a flowchart of the steps involved in generating a recommendation based on a metric, in accordance with one or more embodiments. For example, process 500 may represent the steps taken by one or more devices as shown in FIG. 1 when generating a recommendation based on a metric determined as in FIGS. 2-4. For example, the system may determine a restocking fee protection recommendation of a particular value. The particular value may be based on the frequency of restocking (e.g., from a target user or a group of users) and/or based on the previous return history of a user or the group of users. The system may utilize this previous history to determine a likelihood of return and amount of restocking fee. Additionally or alternatively, the system may determine an amount of a total spend of a user and/or group of users. The system may then base the recommendation on this total spend. For example, the system may receive various criteria and provide a recommendation based on the various criteria.

At step 502, process 500 retrieves (e.g., by control circuitry of one or more of the devices in FIG. 1) a metric. For example, the system may retrieve a metric as generated in FIGS. 2-4. The metric may be based on one or more transactions and between one or more parties. Additionally or alternatively, the metric may be adjusted based on other criteria (e.g., frequency, geographic location, time period, type of content, etc.).

At step 504, process 500 retrieves (e.g., by control circuitry of one or more of the devices in FIG. 1) a threshold for generating a recommendation. For example, the system may store a database listing different thresholds that are required for generating a recommendation. These thresholds may be static or dynamic. For example, the system may have a static threshold whereby a single previous content return value applied to the user or by a source may trigger a recommendation related to the content return value. For example, the system may receive a user input corresponding to a point of sale of a source (e.g., a user swiping a credit card to communication content at the source). In response, the system may determine whether or not the user has ever been subject to a content return value by the source and/or whether the source has ever applied a content return value. If the system determines that a content return value has been previously applied, the threshold is met, and the system determines to generate a recommendation in response.

In another example, the system may receive a user input corresponding to a point of sale of a source (e.g., a user swiping a credit card to communication content at the source). In response, the system may determine whether or not a threshold number of users (e.g., within a given frequency, time period, geographic region, etc.) has been subject to a content return value by the source and/or other source within the given frequency, time period, geographic region, etc. If the system determines that threshold is met, and the system determines to generate a recommendation in response.

At step 506, process 500 determines (e.g., by control circuitry of one or more of the devices in FIG. 1) whether the threshold is met. For example, the system may retrieve the threshold as determined by a data aggregation service, and in response compare the threshold to the current circumstances. In response to determining that the threshold is met, process 500 proceeds to step 508. In response to determining that the threshold is not met, process 500 returns to step 504.

At step 508, process 500 selects (e.g., by control circuitry of one or more of the devices in FIG. 1) a recommendation type. For example, the system may have multiple communication channels and/or different subject matter for different recommendations. In some embodiments, the system may target particular recommendation types to a given user based on the user profile, a threshold or thresholds that were met, a degree to which a metric exceeded a threshold, etc.

At step 510, process 500 generates (e.g., by control circuitry of one or more of the devices in FIG. 1) a recommendation (e.g., either recommendation 114 or recommendation 116) based on the type. For example, the system may generate a recommendation of the select type based on the retrieved metric.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 5.

The above-described embodiments of the present disclosure are presented for purposes of illustration and not for limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of generating recommendations based on encrypted records collected by a data aggregation service during communications between users and content sources, comprising: storing, in a database, a first encrypted record, wherein the first encrypted record includes a first content identifier and a first communication amount for first content corresponding to the first content identifier, and wherein the first encrypted record is generated in response to a receipt of the first content from a first source; storing, in the database, a second encrypted record, wherein the second encrypted record includes the first content identifier and a first communication amount for the first content corresponding to the first content identifier, wherein the second encrypted record is generated in response to a receipt of the first content from the first source; determining, using control circuitry, a first difference between the first communication amount and the first communication amount; determining, using the control circuitry, a first metric for the first source based on the first difference; and generating for display, on a user device, a first recommendation based on the first metric, wherein the first recommendation is for a content return value protection service for the first source.

2. The method of embodiment 2, further comprising: storing a third encrypted record, wherein the third encrypted record includes a second content identifier and a second communication amount for second content corresponding to the second content identifier, wherein the third encrypted record is generated in response to a second communication of the first content from the first source; storing a fourth encrypted record, wherein the fourth encrypted record includes the second content identifier and a second communication amount for the second content corresponding to the second content identifier, wherein the fourth encrypted record is generated in response to a second communication of the second content from the first source; determining a second difference between the second communication amount and the second communication amount; determining a second metric for the first source based on the second difference; determining a composite metric based on the first metric and the second metric; and generating for display a second recommendation based on the composite metric, wherein the second recommendation is for a content return value protection service for the first source.

3. The method of embodiment 3, wherein the first encrypted record and the second encrypted record further include a first user identifier corresponding to a first user, and wherein the third encrypted record and the fourth encrypted record further include second user identifier corresponding to a second user.

4. The method of any one of embodiments 1-3, further comprising: storing the first encrypted record and the second encrypted record in a user profile corresponding to a user; and determining a frequency of communications for the user, wherein the first metric is further based on the frequency.

5. The method of any one of embodiments 1-4, wherein the first encrypted record and the second encrypted record further include a geographic region corresponding to the first communication, and wherein the first metric is further based on the geographic region.

6. The method of any one of embodiments 1-5, wherein the first encrypted record and the second encrypted record further include a time period corresponding to the first communication, and wherein the first metric is further based on the time period.

7. The method of any one of embodiments 1-6, further comprising determining a percentage of the first communication amount corresponding to the first difference, wherein the first metric is further based on the percentage.

8. The method of any one of embodiments 1-7, further comprising predicting a number of communications during a time period, wherein the first metric is further based on the number of communications.

9. The method of any one of embodiments 1-8, wherein the first encrypted record and the second encrypted record further include a content type corresponding to the first content, wherein the first metric is further based on the content type.

10. The method of any one of embodiments 1-9, further comprising: receiving a user input corresponding to a point of sale of the first source; and determining to generate the first recommendation in response to receiving the user input.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating recommendations based on non-delineated records collected by a data aggregation service during communications between users and content sources by populating metadata related to the non-delineated records, the system comprising:

cloud-based memory configured to:
store a first record, wherein the first record includes a first content identifier and a first communication amount for first content corresponding to the first content identifier, and wherein the first record is generated in response to a first communication indicating a receipt of the first content from a first source;
store a second record, wherein the second record includes the first content identifier and a first return amount for the first content corresponding to the first content identifier, wherein the second record is generated in response to returning the first content to the first source;
store a third record, wherein the third record includes a second content identifier and a second communication amount for second content corresponding to the second content identifier, wherein the third record is generated in response to a second communication of the second content from a second source;
store a fourth record, wherein the fourth record includes the second content identifier and a second return amount for the second content corresponding to the second content identifier, wherein the fourth record is generated in response to returning the second content to the second source;

cloud-based control circuitry configured to:
delineate the first communication amount and the first return amount from the first record and the second record by:
generating a first new record for the first content identifier comprising the first communication amount;
parsing first publicly-available information from the first source for metadata for delineating the first communication amount and the first return amount from the first record and the second record, wherein the first publicly-available information comprises first published content return values;
identifying first metadata from the first publicly-available information that is related to the first content using a fuzzy matching algorithm that compares the first content identifier to the first publicly-available information, wherein the first metadata comprises a first published content return value of the first published content return values;
populating the first new record with the first metadata;
determining a delineated first communication amount based on the first new record;
determining a delineated first return amount based on the first new record;
determine a first difference between the delineated first communication amount and the delineated first return amount;
determine a first metric for the first source equal to the first difference, wherein the first metric comprises a first content return value difference for the first content;
delineate the second communication amount and the second return amount from the third record and the fourth record by:
generating a second new record for the second content identifier comprising the second communication amount;
parsing second publicly-available information from the second source for metadata for delineating the second communication amount and the second return amount from the third record and the fourth record, wherein the second publicly-available information comprises second published content return values;
identifying second metadata from the second publicly-available information that is related to the second content using the fuzzy matching algorithm that compares the second content identifier to the second publicly-available information, wherein the second metadata comprises a second published content return value of the second published content return values;
populating the second new record with the second metadata;
determining a delineated second communication amount based on the second new record;
determining a delineated second return amount based on the second new record;
determine a second difference between the second communication amount and the second return amount;
determine a second metric for the second source equal to the second difference; and
determine a composite metric based on the first metric and the second metric, wherein the composite metric comprises an average content return value difference; and cloud-based I/O circuitry configured to:
generate for display, on a user device, a recommendation based on the composite metric, wherein the recommendation is for a content return value protection service for the first source.

2. A method of generating recommendations based on non-delineated records collected by a data aggregation service during communications between users and content sources by populating metadata related to the non-delineated records, comprising:

storing, in a database, a first record, wherein the first record includes a first content identifier and a first communication amount for first content corresponding to the first content identifier, and wherein the first record is generated in response to a first communication indicating a receipt of the first content from a first source;

storing, in the database, a second record, wherein the second record includes the first content identifier and a first return amount for the first content corresponding to the first content identifier, wherein the second record is generated in response to returning the first content to the first source;

delineating the first communication amount and the first return amount from the first record and the second record by:

generating a first new record for the first content identifier comprising the first communication amount;

parsing first publicly-available information from the first source for metadata for delineating the first communication amount and the first return amount from the first record and the second record, wherein the first publicly-available information comprises first published content return values;

identifying first metadata from the first publicly-available information that is related to the first content using a fuzzy matching algorithm that compares the first content identifier to the first publicly-available information, wherein the first metadata comprises a first published content return value of the first published content return values;

populating the first new record with the first metadata;

determining a delineated first communication amount based on the first new record;

determining a delineated first return amount based on the first new record;

determining, using control circuitry, a first difference between the delineated first communication amount and the delineated first return amount;

determining, using the control circuitry, a first metric for the first source equal to the first difference; and generating for display, on a user device, a first recommendation based on the first metric, wherein the first recommendation is for a content return value protection service for the first source.

3. The method of claim 2, further comprising:

storing a third record, wherein the third record includes a second content identifier and a second communication amount for second content corresponding to the second content identifier, wherein the third record is generated in response to a second communication of the first content from the first source;

storing a fourth record, wherein the fourth record includes the second content identifier and a second return amount for the second content corresponding to the second content identifier, wherein the fourth record is generated in response to returning the second content to the first source;

delineating the second communication amount and the second return amount from the third record and the fourth record by:

generating a second new record for the second content identifier comprising the second communication amount;

parsing second publicly-available information from a second source for metadata for delineating the second communication amount and the second return amount from the third record and the fourth record, wherein the second publicly-available information comprises second published content return values;

identifying second metadata from the second publicly-available information that is related to the second content using the fuzzy matching algorithm that compares the second content identifier to the second publicly-available information, wherein the second metadata comprises a second published content return value of the second published content return values;

populating the second new record with the second metadata;

determining a delineated second communication amount based on the second new record;

determining a delineated second return amount based on the second new record;

determining a second difference between the delineated second communication amount and the delineated second return amount;

determining a second metric for the first source based on the second difference, wherein the second metric comprises a difference in a content return value for the second content;

determining a composite metric based on the first metric and the second metric, wherein the composite metric comprises an average content return value; and generating for display a second recommendation based on the composite metric, wherein the second recommendation is for a content return value protection service for the first source.

4. The method of claim 3, wherein the first record and the second record further include a first user identifier corresponding to a first user, and wherein the third record and the fourth record further include second user identifier corresponding to a second user.

5. The method of claim 2, further comprising:

storing the first record and the second record in a user profile corresponding to a user; and determining a frequency of communications for the user, wherein the first metric is further based on the frequency.

6. The method of claim 2, wherein the first record and the second record further include a time period corresponding to the delineated first communication, and wherein the first metric is further based on the time period.

7. The method of claim 2, wherein the first record and the second record further include a geographic region corresponding to the first communication, and wherein the first metric is further based on the geographic region.

8. The method of claim 2, further comprising determining a percentage of the first communication amount corresponding to the first difference, wherein the first metric is further based on the percentage.

9. The method of claim 2, further comprising predicting a number of communications during a time period, wherein the first metric is further based on the number of communications.

10. The method of claim 2, wherein the first record and the second record further include a content type corresponding to the first content, wherein the first metric is further based on the content type.

11. The method of claim 2, further comprising:
receiving a user input corresponding to a point of sale of the first source; and
determining to generate the first recommendation in response to receiving the user input.

12. A non-transitory computer-readable medium generating recommendations based on non-delineated records collected by a data aggregation service during communications between users and content sources by populating metadata related to the non-delineated records, comprising instructions that, when executed by one or more processors, cause operations comprising:
storing a first record, wherein the first record includes a first content identifier and a first communication amount for first content corresponding to the first content identifier, and wherein the first record is generated in response to a first communication indicating a receipt of the first content from a first source;
storing a second record, wherein the second record includes the first content identifier and a first return amount for the first content corresponding to the first content identifier, wherein the second record is generated in response to a user returning the first content to the first source;
delineating the first communication amount and the first return amount from the first record and the second record by:
generating a new record for the first content identifier comprising the first communication amount;
parsing first publicly-available information from the first source for metadata for delineating the first communication amount and the first return amount from the first record and the second record, wherein the first publicly-available information comprises first published content return values;
identifying first metadata from the first publicly-available information that is related to the first content using a fuzzy matching algorithm that compares the first content identifier to the first publicly-available information, wherein the first metadata comprises a first published content return value of the first published content return values;
populating the new record with the metadata;
determining a delineated first communication amount based on the new record;
determining a delineated first return amount based on the new record;
determining a first difference between the delineated first communication amount and the delineated first return amount;
determining a first metric for the first source equal to the first difference, wherein the first metric comprises a first content return value difference for the first content; and
generating for display a first recommendation based on the first metric, wherein the first recommendation is for a content return value protection service for the first source.

13. The non-transitory computer-readable medium of claim 12, further comprising instructions that, when executed by one or more processors, cause operations comprising:
storing a third record, wherein the third record includes a second content identifier and a second communication amount for second content corresponding to the second content identifier, wherein the third record is generated in response to a second communication of the first content from the first source;
storing a fourth record, wherein the fourth record includes the second content identifier and a second return amount for the second content corresponding to the second content identifier, wherein the fourth record is generated in response to returning the second content to the first source;
delineating the second communication amount and the second return amount from the third record and the fourth record by:
generating a second new record for the second content identifier comprising the second communication amount;
parsing second publicly-available information from a second source for metadata for delineating the second communication amount and the second return amount from the third record and the fourth record, wherein the second publicly-available information comprises second published content return values;
identifying second metadata from the second publicly-available information that is related to the second content using the fuzzy matching algorithm that compares the second content identifier to the second publicly-available information, wherein the second metadata comprises a second published content return value of the second published content return values;
populating the second new record with the second metadata;
determining a delineated second communication amount based on the second new record;
determining a delineated second return amount based on the second new record;
determining a second difference between the delineated second communication amount and the delineated second return amount;
determining a second metric for the first source based on the second difference, wherein the second metric comprises a second content return value difference for the second content;
determining a composite metric based on the first metric and the second metric, wherein the composite metric comprises an average content return value difference; and
generating for display a second recommendation based on the composite metric, wherein the second recommendation is for a content return value protection service for the first source.

14. The non-transitory computer-readable medium of claim 13, wherein the first record and the second record further include a first user identifier corresponding to a first user, and wherein the third record and the fourth record further include second user identifier corresponding to a second user.

15. The non-transitory computer-readable medium of claim 12, further comprising instructions that, when executed by one or more processors, cause operations comprising:
storing the first record and the second record in a user profile corresponding to the user; and
determining a frequency of communications for the user, wherein the first metric is further based on the frequency.

16. The non-transitory computer-readable medium of claim 12, wherein the first record and the second record further include a time period corresponding to the first communication, and wherein the first metric is further based on the time period.

17. The non-transitory computer-readable medium of claim 12, wherein the first record and the second record further include a geographic region corresponding to the first communication and a content type of the first content, and wherein the first metric is further based on the geographic region and the content type.

18. The non-transitory computer-readable medium of claim 12, further comprising instructions that, when executed by one or more processors, cause operations comprising determining a percentage of the delineated first communication amount corresponding to the first difference, wherein the first metric is further based on the percentage.

19. The non-transitory computer-readable medium of claim 12, further comprising instructions that, when executed by one or more processors, cause operations comprising predicting a number of communications during a time period, wherein the first metric is further based on the number of communications.

20. The non-transitory computer-readable medium of claim 12, further comprising instructions that, when executed by one or more processors, cause operations comprising:

receiving a user input corresponding to a point of sale of the first source; and determining to generate the first recommendation in response to receiving the user input.

\* \* \* \* \*